United States Patent [19]
Glenn

[11] Patent Number: 5,868,979
[45] Date of Patent: Feb. 9, 1999

[54] AUTOMATIC ROTAMOULDING APPARATUS AND METHOD OF CONTROL

[75] Inventor: Robert John Glenn, Williams, Australia

[73] Assignee: Automated Plastic Systems Pty. Ltd., Australia

[21] Appl. No.: 693,325
[22] PCT Filed: Feb. 17, 1995
[86] PCT No.: PCT/AU95/00081
§ 371 Date: Oct. 15, 1996
§ 102(e) Date: Oct. 15, 1996
[87] PCT Pub. No.: WO95/22449
PCT Pub. Date: Aug. 24, 1995

[30] Foreign Application Priority Data

Feb. 18, 1994 [AU] Australia .................... PM3990

[51] Int. Cl.⁶ .................... B29C 41/04; B29C 41/06; B29C 41/52
[52] U.S. Cl. .................... 264/40.6; 264/40.1; 264/310; 264/311; 425/144; 425/145; 425/435
[58] Field of Search .................... 264/40.1, 40.6, 264/310, 311; 425/144, 145, 435

[56] References Cited

U.S. PATENT DOCUMENTS

| 3,566,439 | 3/1971 | Mouly et al. | 425/144 |
| 3,891,370 | 6/1975 | Giehler | 425/144 |
| 4,285,903 | 8/1981 | Lemelson | 264/310 |
| 4,389,177 | 6/1983 | Colby | 425/144 |
| 4,956,135 | 9/1990 | Payne | 425/145 |
| 5,221,539 | 6/1993 | Pallerberg, et al. | 425/144 |
| 5,322,654 | 6/1994 | Crawford | 264/40.6 |

FOREIGN PATENT DOCUMENTS

| 0 266 100 | 5/1988 | European Pat. Off. . |
| 2048151 | 12/1980 | United Kingdom . |
| WO 91/05647 | 5/1991 | WIPO . |

*Primary Examiner*—James Derrington
*Attorney, Agent, or Firm*—Michael Best & Friedrich

[57] ABSTRACT

A method for controlling an automatic rotamolding process, the method including the steps of: metering a first prescribed quantity of plastics material powder into a hopper to be delivered to a rotatable mold as a first shot; heating the mold; when the mold reaches a prescribed temperature, delivering the first shot of powder from the hopper to the mold and simultaneously rotating the mold so as to distribute the powder over an interior surface of the mold; heating the mold in accordance with a predetermined temperature-time characteristic; cooling the mold; and ejecting the finished rotamolded product from the mold.

12 Claims, 14 Drawing Sheets

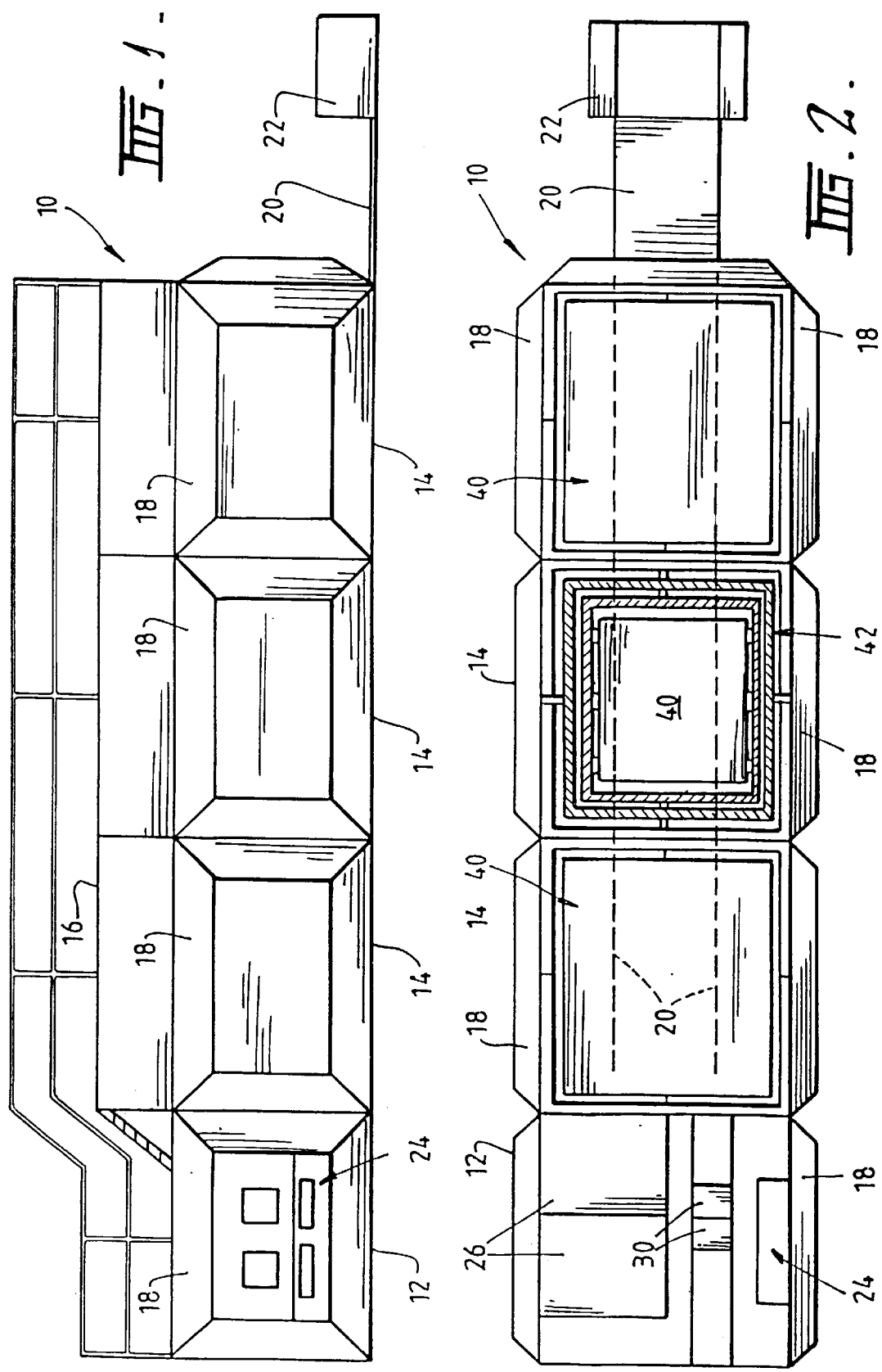

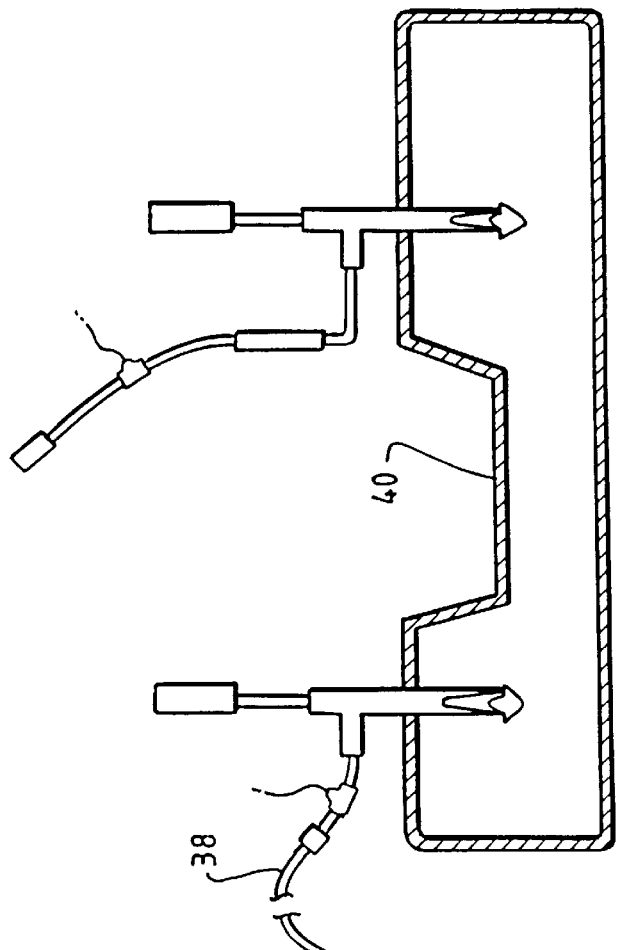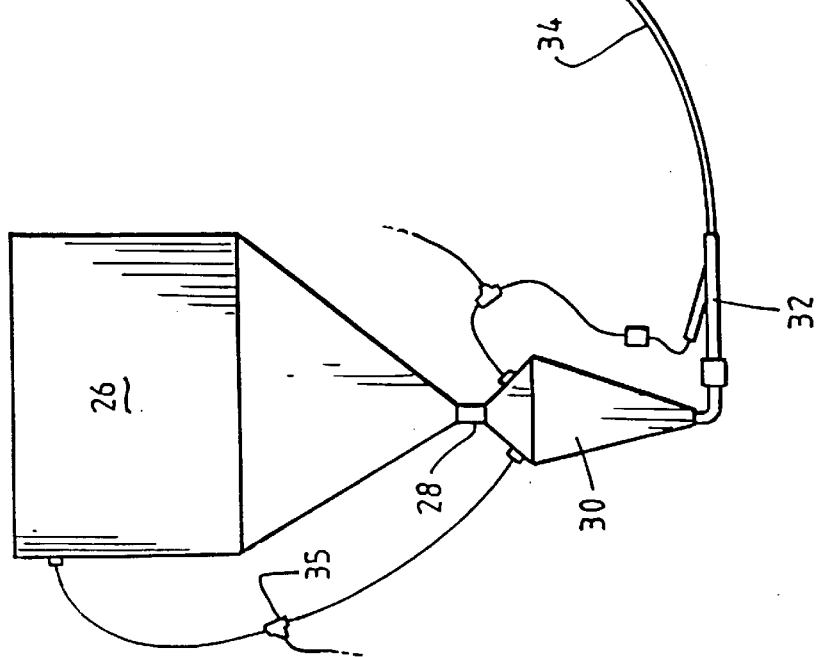
FIG. 3.

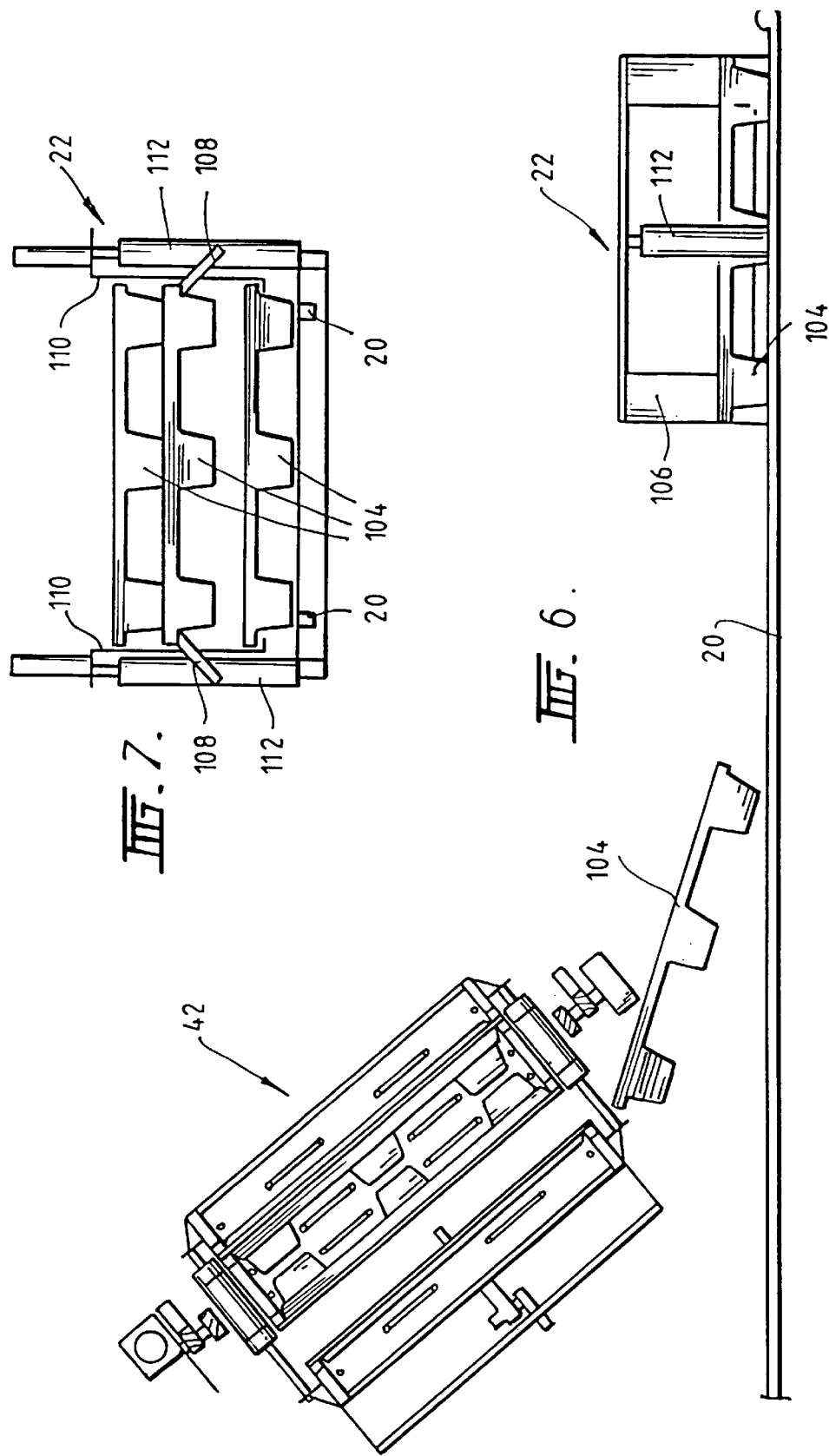

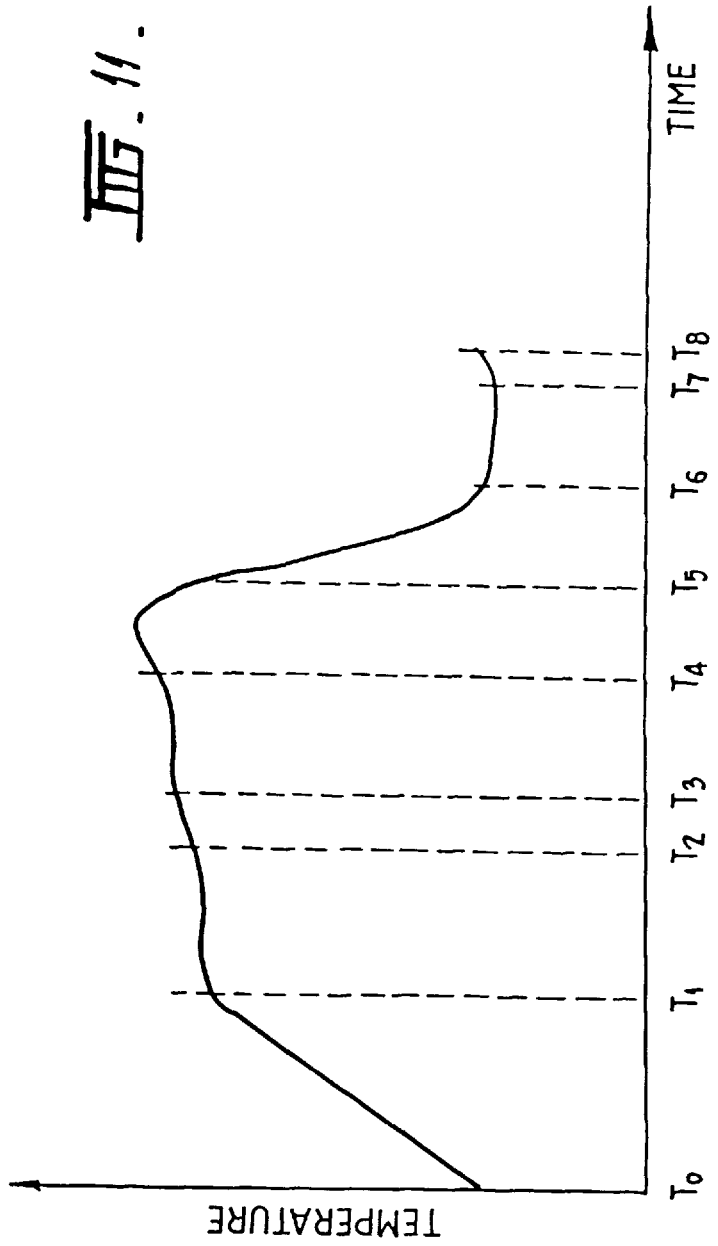

AUTOMATIC ROTAMOULDING APPARATUS AND METHOD OF CONTROL

FIELD OF THE INVENTION

The present invention relates to rotational moulding apparatus and processes and relates particularly, though not exclusively, to an automatic rotamoulding apparatus and method of control.

BACKGROUND TO THE INVENTION

Rotational moulding (or rotamoulding) is a process for manufacturing hollow plastics products in which a powdered thermoplastic material, typically polyethylene and/or polypropylene, is melted in a heated mould and in which there is typically no pressure applied to cause the plastics material to take up the shape of the mould. Plastics powder is placed in one half of a mould which is then closed and rotated in an oven. Typically the mould itself is rotated biaxially about two perpendicular axes, although in some rotamoulding systems the mould is rotated about one axis inside an oven, and the oven itself and/or the mould is pivoted about a second perpendicular axis (the so-called "rock and roll" rotamoulding system).

As the mould rotates in the oven it heats up, typically to around 200° C., and the plastics material powder starts to melt and coat the inner surface of the mould. Due to the biaxial movement of the mould the powder distributes itself substantially uniformly over the entire inner surface of the mould. When all the powder is melted, the mould is cooled to cause the melted plastics material to solidify in the desired shape. Rotation of the mould is then ceased and it can then be opened to remove the plastic product. The advantages of rotamoulding are increasingly being recognised by manufacturers, including the relatively low cost of moulds, the production of stress-free products (always a problem with injection moulding) and the possibility of novel shapes and designs.

Current rotamoulding machines and processes are relatively labour-intensive. Manual intervention is typically required to open and close the mould and to place the powder in the mould. Moving the mould into and out of the oven and into a cooling station may also be performed manually. Furthermore, due to the biaxial rotation of the mould typically very little control can be exercised over the process within the mould and therefore there is a heavy reliance on experience and trial and error procedures. This latter problem of process control has been overcome to some extent with the development of the rotational moulding process control system developed by The Queens University of Belfast and described in WO 91/0564 ("the ROTOLOG system").

The ROTOLOG system monitors the air temperature inside the mould and transmits this information to a remotely located computer. The real time output from the ROTOLOG system allows the machine operators and quality control personnel to identify the time at which all the powder is melted, the maximum internal air temperature within the mould, the time at which the product has solidified and the heating/cooling rates during the rotamoulding process. Whilst the ROTOLOG system has removed much of the guesswork from the rotamoulding process, it has not reduced the level of manual intervention required. Furthermore, because the ROTOLOG system measures the air temperature within the mould, rather than the actual melt temperature or mould temperature it cannot identify temperature variations on the interior surface of the mould which may have a significant impact on the characteristics of the finished product.

SUMMARY OF THE INVENTION

The present invention was developed with a view to providing a rotamoulding apparatus and method of process control in which a rotamoulded product can be produced with minimal or no manual intervention.

According to one aspect of the present invention there is provided an automatic rotamoulding apparatus comprising:

a rotatable mould mounted for rotation, having heating means provided in connection therewith for heating the mould directly during rotation and sensing means provided in connection therewith for sensing the temperature of the mould;

delivery means for automatically delivering a plastics material powder to the mould during rotation; and, electronic control means operatively connected to said delivery means, said heating means and said sensing means, for controlling the delivery of plastics material to the mould and for controlling the temperature of the mould throughout the rotamoulding process responsive to said sensing means whereby, in use, a rotamoulded product can be produced in the mould without manual intervention.

In a preferred embodiment, said rotatable mould is one of a plurality of rotatable moulds mounted in a plurality of modules, each module being independently operable under the control of said electronic control means. Typically each mould comprises first and second components movably mounted within a first support frame adapted for rotation about a first axis, said first component of the mould being movable relative to the second component between a first position in which the mould is closed and ready to receive a shot of plastics material powder, and a second position in which the mould is opened and the finished rotamoulded product can be removed. In the preferred embodiment each mould further comprises actuating means operatively connected to said electronic control means for moving the first and second components between said first and second positions.

Advantageously said heating means comprises a plurality of electric heating elements provided in thermal contact with the first and second components of the mould and said sensing means comprises a plurality of temperature sensing devices provided in connection with the first and second halves of the mould in predetermined locations.

Preferably each rotatable mould further comprises cooling means to facilitate forced cooling of the mould following heating. Typically said cooling means comprises a passage extending proximate to said first and second components of the mould and pumping means operatively connected to said electronic control means for pumping cooling medium through said passages.

Preferably the automatic rotamoulding apparatus further comprises conveyor means for conveying a finished rotamoulded product from the mould to a location remote from the mould. In one embodiment the apparatus is also provided with stacking means for stacking the finished rotamoulded products as they arrive at said remote location.

According to another aspect of the present invention there is provided a method for controlling an automatic rotamoulding process using an electronic control means operatively connected to a delivery means, a heating means and a sensing means, the method comprising the steps of:

metering a first prescribed quantity of plastics material powder into a hopper, to be delivered to a rotatable mould as a first shot;

operating said heating means provided in connection with the mould to heat the mould;

actuating said delivering means to deliver the first shot of powder from said hopper to the mould and simultaneously rotating the mould so as to distribute the powder over an interior surface of the mould;

monitoring said sensing means provided in connection with the mould to sense the temperature of the mould during rotation;

controlling the operation of said heating means in accordance with a predetermined temperature-time characteristic and responsive to said monitoring of the sensing means;

cooling the mould; and, ejecting the finished rotamoulded product from the mould.

Preferably the method further comprises the steps of:

conveying the finished rotamoulded product on a conveyor to a stacking apparatus; and, stacking the finished rotamoulded product to form a stack of such finished rotamoulded products.

BRIEF DESCRIPTION OF THE ACCOMPANYING DRAWINGS

In order to facilitate a better understanding of the nature of the invention a preferred embodiment of the automatic rotamoulding apparatus and method of control will now be described in detail, by way of example only, with reference to the accompanying drawings, in which:

FIG. 1 is a side elevation of a preferred embodiment of the automatic rotamoulding apparatus according to the invention, in the form of an Automatic Pallet-making Machine (APM);

FIG. 2 is a plan view of the APM of FIG. 1;

FIG. 3 illustrates schematically part of the APM of FIG. 1;

FIG. 6 illustrates a finished pallet being ejected onto a conveyor means for conveying the pallet to a preferred stacking means;

FIG. 7 is an end elevation of the stacking means of FIG. 6;

Figure 4:
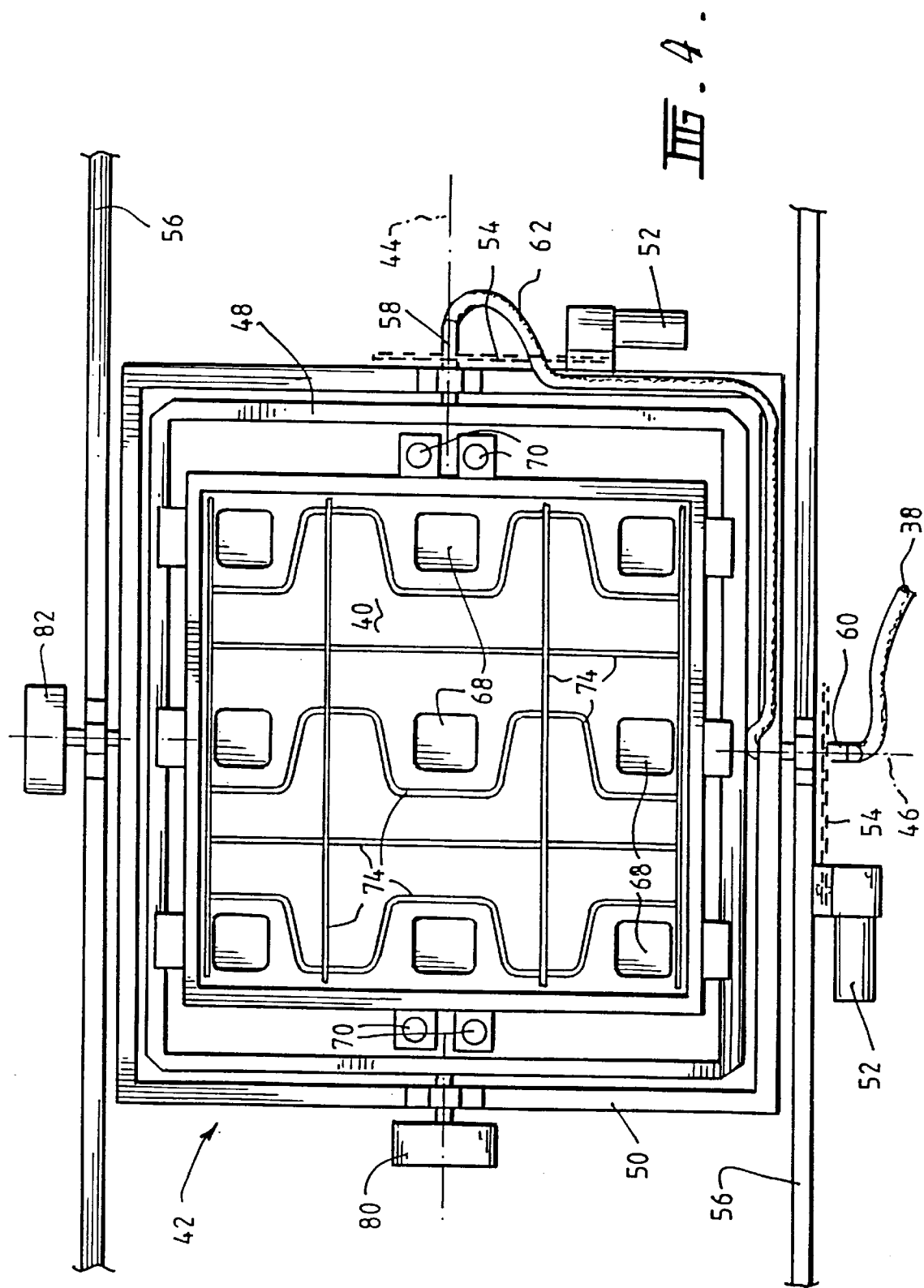
FIG. 4 is a plan view of a preferred embodiment of a rotatable mould assembly for the APM of FIG. 1, mounted in a pair of biaxially rotatable frames.
Figure 8A:
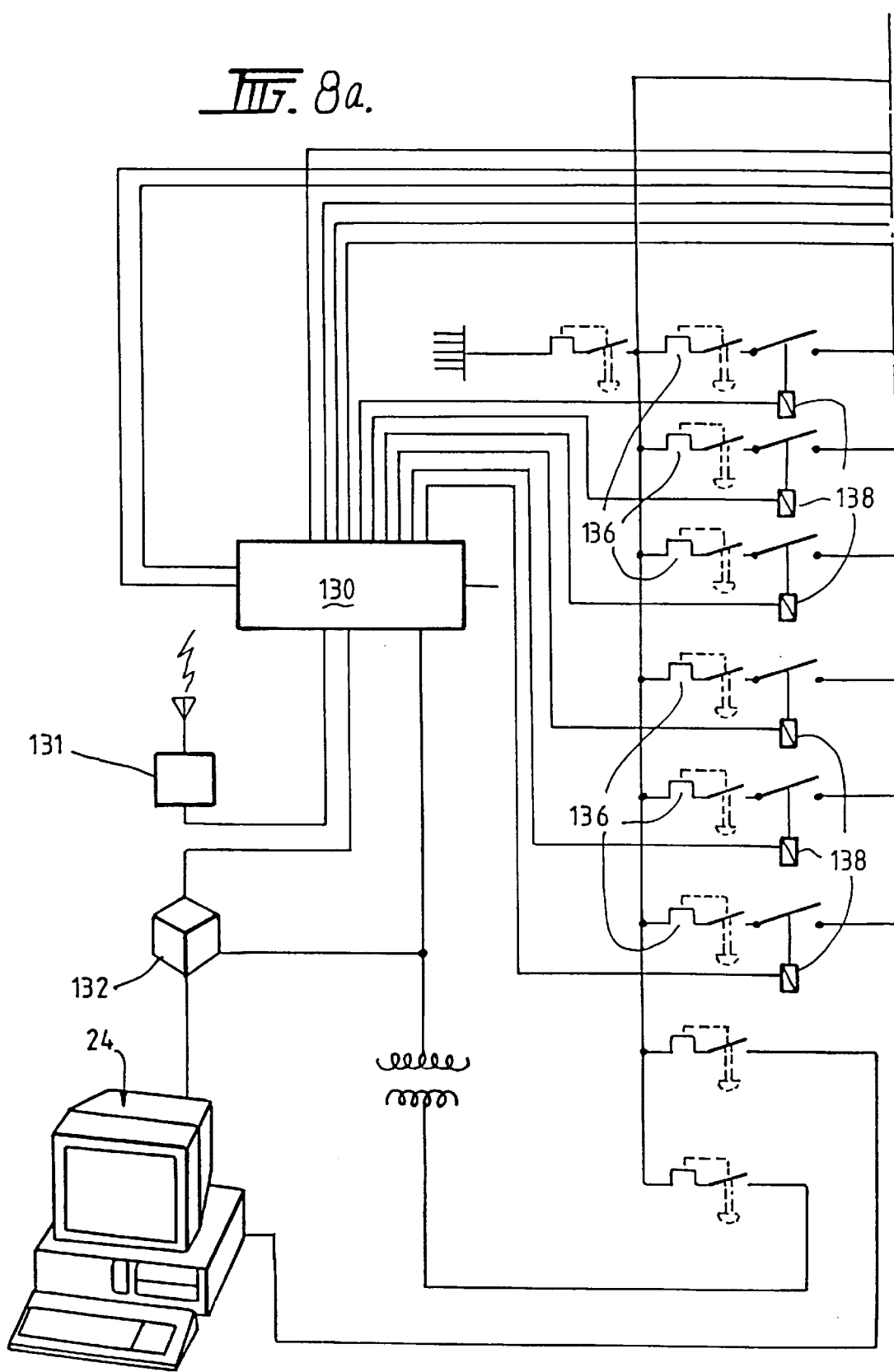
Figure 8B:
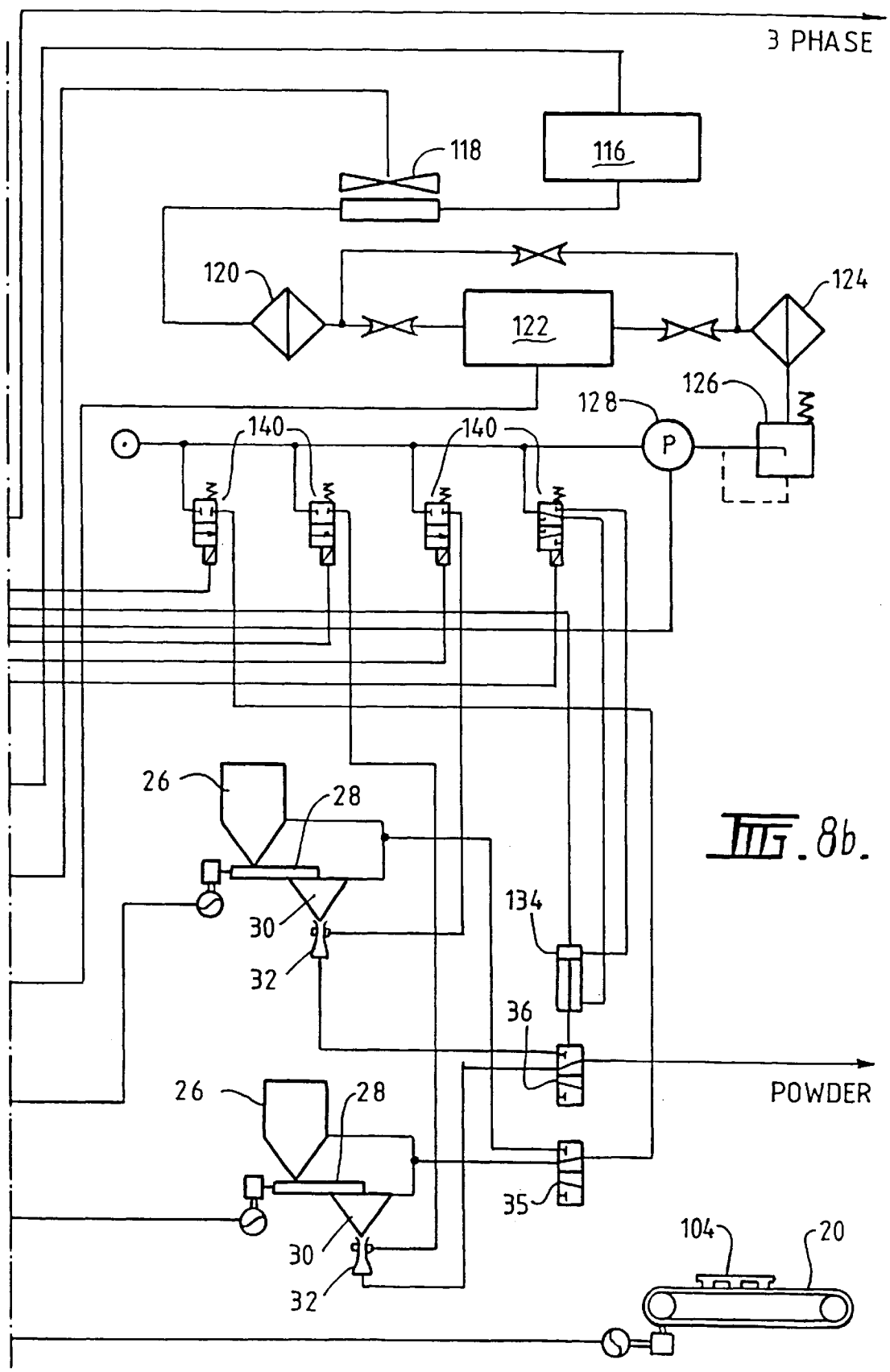
Figure 10A:
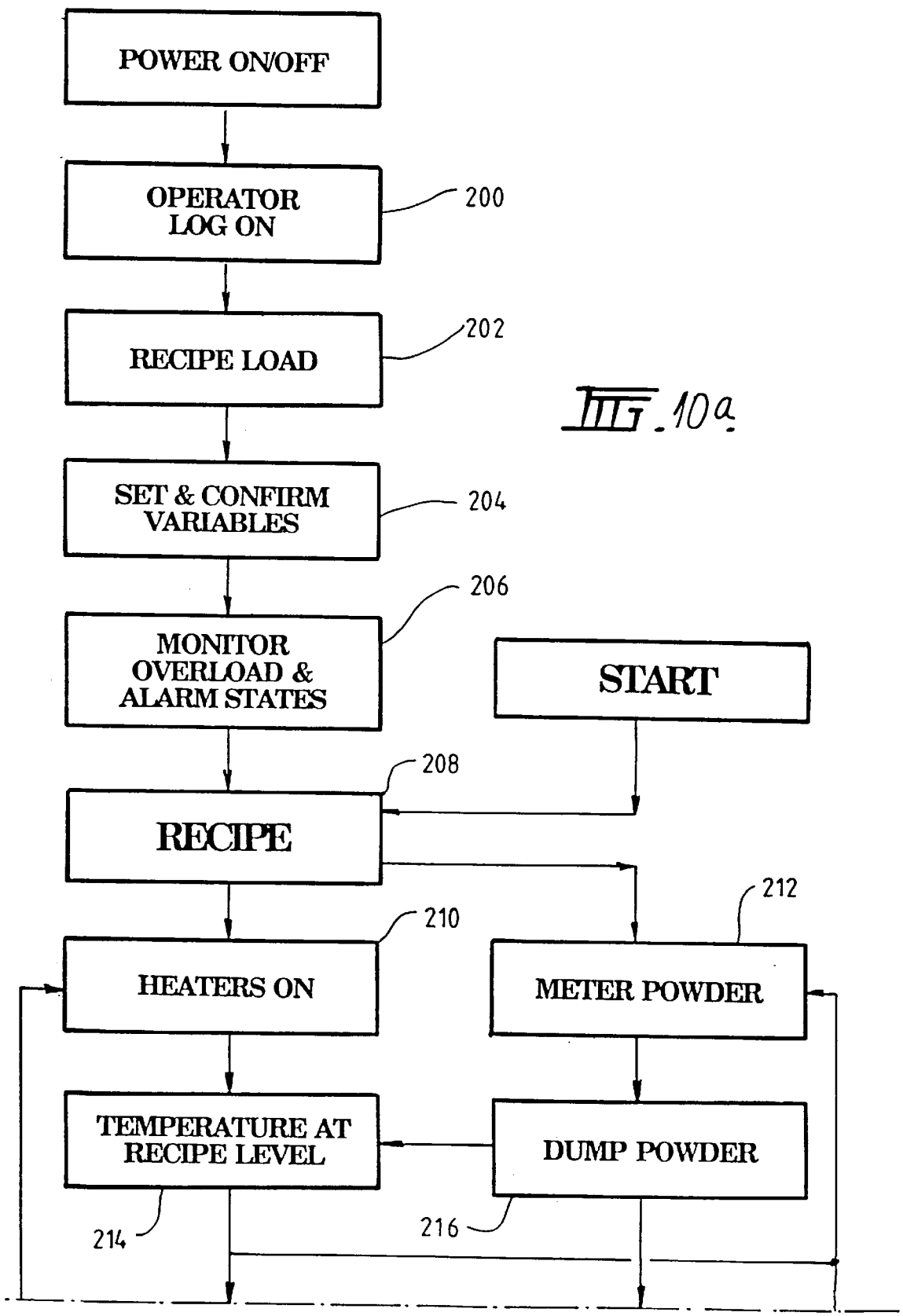
Figure 10B:
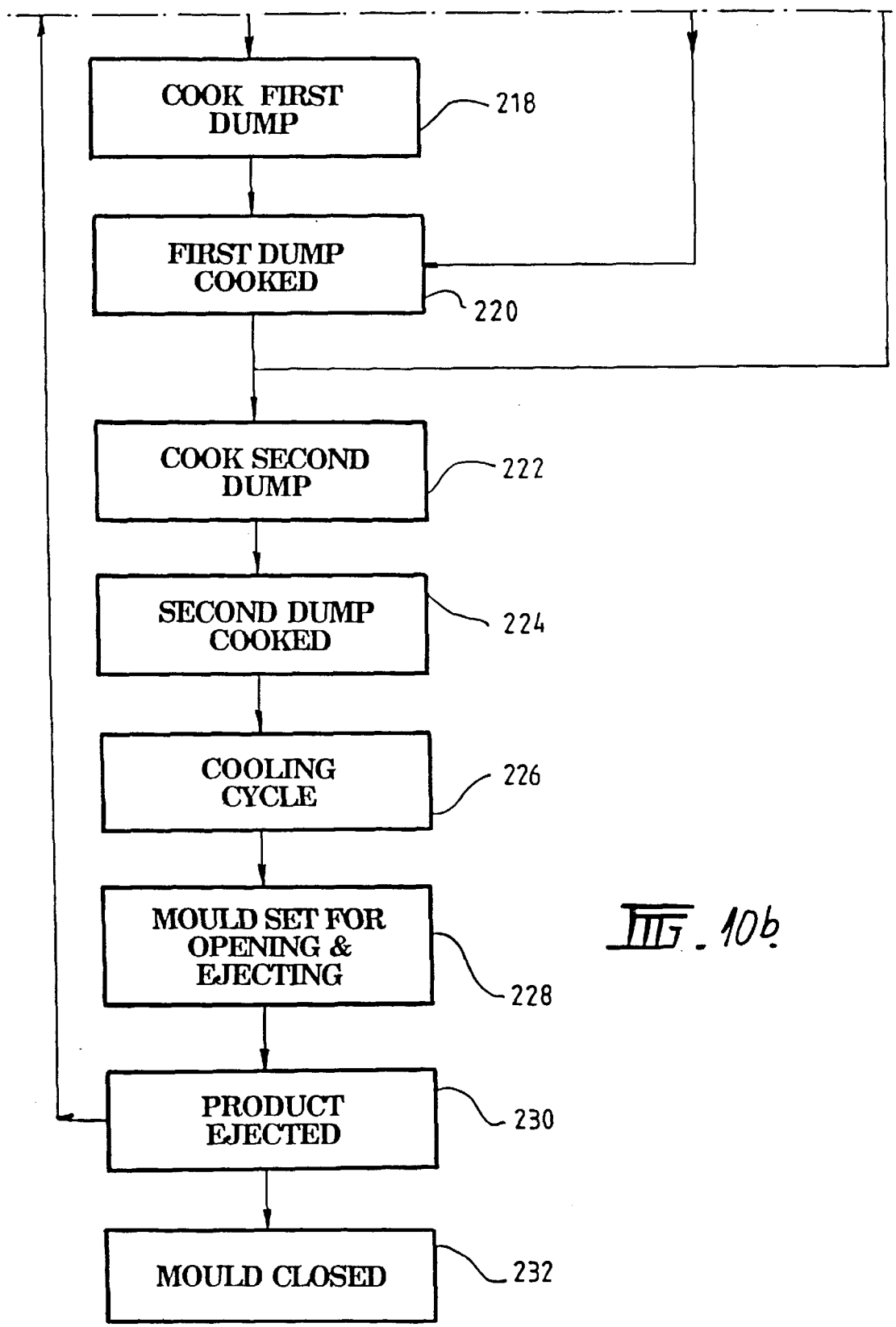

FIGS. 8(a) and 8(b) are a schematic block diagram illustrating the pneumatic circuit, flow path of powder, and the electric power and control circuits in a control module of the APM of FIG. 1;

FIGS. 9(a) 9(b), 9(c) and 9(d) are schematic block diagrams illustrating the pneumatic circuit, the flow path of powder and the electric power and control circuits in a production module of the APM of FIG. 1;

FIGS. 10(a) 10(b) are a flow diagram illustrating the control sequence of the APM of FIG. 1; and, FIG. 11 is a graphical representation of a typical temperature time characteristic of a heating cycle for the mould of FIG. 4.

DETAILED DESCRIPTION OF PREFERRED EMBODIMENT

The following detailed description will be given with respect to an Automatic Pallet-making Machine (APM) for mass-producing plastic pallets using a rotamoulding process. A huge number of pallets are manufactured and used world-wide for transporting and storing loads. At present, the majority of such pallets are still manufactured from wood materials, although an increasing number are being manufactured from plastics materials. In order to compete with wooden pallets, plastic pallets must be of equal strength and their manufacture must be economically feasible. The rotamoulding process is well-suited to this application, since the pallets can be made of hollow construction and with careful design can have a mechanical strength and handleability which is equivalent, if not better, than wooden pallets.

It will be readily understood that the automatic rotamoulding apparatus and method of control described can also be used to manufacture other rotamoulded products, and is not limited to manufacturing plastic pallets. With minor modifications and the appropriate moulds, the automatic rotamoulding apparatus herein described can be used to manufacture any product which is amenable to rotational moulding.

FIGS. 1 and 2 illustrate an automatic rotamoulding apparatus in the form of an Automatic Pallet-making Machine (APM) 10 which comprises four modules, a control module 12 and three substantially identical production modules 14 which in this embodiment are arranged in a linear array to form a pallet production line. A catwalk 16 provided above the APM 10 allows a process operator and/or observers to walk along the length of the machine to observe the operation of each of the modules 12, 14 from above. Side walls 18 of the modules 12, 14 are mounted on hinges and can be swung open to allow access for maintenance purposes or to modify the configuration of the APM 10. A conveyor 20 extends the full length of the three production modules 14 and is adapted to carry the finished pallets to a stacking means in the form of a pallet stacker 22.

Control module 12 controls the operation of the production modules 14 and includes electronic control means comprising one or more computer terminals 24 mounted in a control console in the side wall 18 of the control module 12. The electronic control means also comprises associated peripheral devices and remote terminal units (RTUs) or programmable logic controllers (PLCs). The video display units (VDUs) of the computer terminals 12 provide visual information and feedback to the machine operator of numerous control parameters and the operation of the APM 10. The control console of control module 12 may also include various other visual and aural indicators, for example, an LED display to monitor the operation of the APM 10. The keyboards of computer terminals 24 allow the operator to program the APM with a required "recipe" for the rotamoulding process and to access various levels of the process control program. The electronic control means may comprise a remote computer interface which communicates with one or more PLC's on the production module(s).

The process control program typically provides several security levels of access, so that the owner of the APM can prevent unauthorised access to sensitive proprietary information concerning the control process and product "recipe". Thus, for example, only the first two levels can be accessed by the operator, whereas the owner of the APM 10 can access other levels including various reporting functions concerning the machine operation. In the case of a leased machine, the supplier of the APM 10 may access still further levels, including diagnostics and other reporting systems to control the licensed use of the machine. The electronic control means may also include a modem to allow on-line communication via the public telephone network between the supplier and the APM 10. In this way, the supplier can interrogate the electronic control means of the APM for fault-finding purposes or to obtain an update from various reporting systems. The operation of the electronic control means and control software will be described in more detail below.

The control module 12 typically houses two primary hoppers 26 for containing for example, two different types of plastic material powder respectively. Each primary hopper 26 is provided with a metering means 28, (see FIG. 3) for metering a predetermined quantity of plastics material powder into respective secondary hoppers 30. Metering means 28 may be a metering screw or butterfly valve. The secondary hopper 30 is provided with an exhaust valve 35 to exhaust air back into the primary hopper 26 when the secondary hopper is filling with powder. Each secondary hopper 30 is fitted with a fluidiser tube 32 which fluidises the granules of powder in an air stream for delivery via transfer lines 34 to a diverter valve 36 (not illustrated in FIG. 3). The diverter valve 36 is connected to a powder transfer line 38 through which the plastics material powder is transferred to a rotatable mould 40 in one of the production modules 14. The primary and secondary hoppers 26, 30, metering means 28, transfer lines 34, 38, fluidiser tubes 32 and the diverter valve all constitute part of a preferred form of delivery means for delivering plastics material powder to the rotating mould 40 during rotation. This preferred form of delivery means in which the powder is carried in an air stream to the rotating mould 40, is fully described in the specification which accompanied Australian Provisional Application No. PN0666 the contents of which are incorporated herein by reference.

FIGS. 8 and 9 are schematic block diagrams illustrating the pneumatic circuit and flow path of powder in the APM 10, as well as the electric power and control circuits in the APM 10. FIG. 8 illustrates those parts of the respective circuits found in the control module 12, whilst FIGS. 9(a) and 9(b) illustrate those parts of the circuits found in the production modules 14.

Referring to FIG. 8, it can be seen that the control module 12 also houses an air compressor 116 used to provide compressed air for the pneumatic circuit in the APM. Compressed air from the compressor 116 is partially refrigerated in an after-cooler 118 and any moisture in the air is then removed as it passes through a water trap 120 and dryer 122. It is important that the air stream used to fluidise the plastics material powder is moisture free so that no moisture enters the mould 40 with the powder, which would have a deleterious effect on the quality of the rotamoulded product. The cooled air from the dryer 122 then passes through an air filter 124 and a pressure regulator 126 before passing into the remainder of the pneumatic circuit in the APM 10. A pressure switch 128 continually monitors the air pressure from regulator 126 to ensure that it is maintained within a prescribed range. If the air pressure falls below a predetermined minimum threshold or exceeds a predetermined maximum threshold, a signal is transmitted to the computer terminal 24 via a remote terminal unit (RTU) 130. The RTU 130 in control module 12 comprises a programmable microprocessor and other integrated circuits to provide analog to digital conversion of signals from various sensors in the APM, for example, the pressure signal from pressure switch 128. The RTU 130 also provides serial to parallel processing and vice versa of control signals to and from the computer terminal 24 via a radio frequency link 131 and a modem 132. The RTU 130 constantly updates the various digital end analog inputs from the APM 10, and once every second the computer terminal 24 polls each of the RTUs to obtain current values held in memory registers in the RTUs. Each of the pneumatic cylinders employed in the APM 10 such as, for example, the cylinder 134 for actuating the diverter valve 36, are provided with proximity sensors to detect when the pneumatic ram is in its fully opened and fully closed positions.

A three phase electrical power supply is connected to the compressor 116, after-cooler 118, dryer 122, the electrical motors driving metering means 28 and the electric motor driving the conveyor 20, via overload circuit breakers 136 and relays 138. Each of the relays 138 is connected to the RTU 130 so that the supply of electrical power to each part of the control module is under direct control of the computer terminal 24. Also illustrated in FIG. 8 are four pneumatic valves 140 for controlling the supply of compressed air to the fluidiser tubes 32, exhaust valve 35 and the pneumatic ram 134 for diverter valve 36.

The arrangement of each rotatable mould and its associated control devices in the respective production modules 14 will now be described with reference to FIGS. 2, 4, 5, 9(a) and 9(b).

Figure 5:
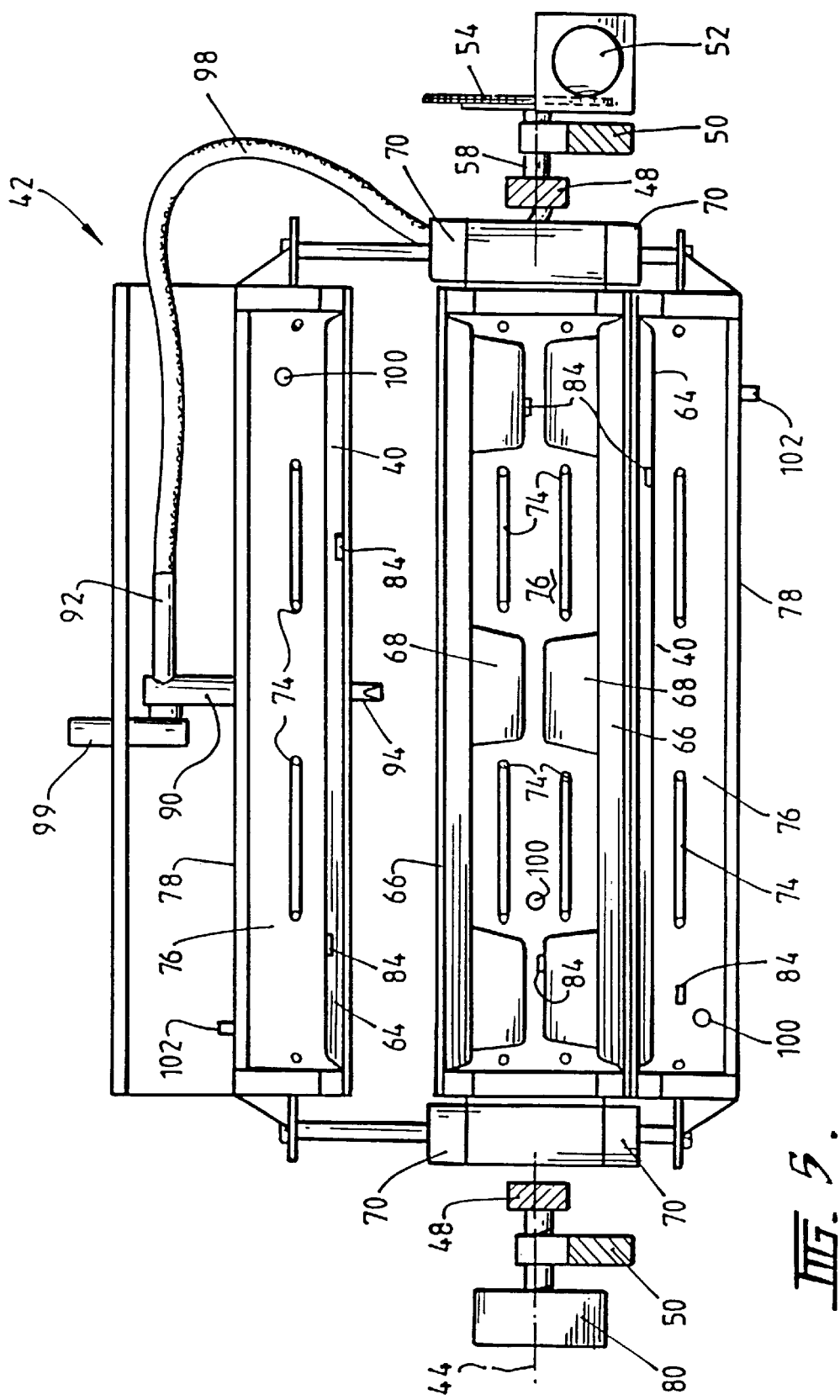
FIG. 5 is a side view of the rotatable mould assembly of FIG. 4.

In FIG. 2, a rotatable mould 40 is visible in only one of the production modules 14, although the other two production modules 14 also house a rotatable mould assembly 42 which is substantially identical to that illustrated. FIGS. 4 and 5 illustrate in greater detail one of the rotatable mould assemblies 42 employed in the APM 10.

The rotamoulding mould 40 is mounted for biaxial rotation about first and second perpendicular axes 44 and 46 respectively. The mould 40 is fixed to a first support frame 48 which is rotatably mounted for rotation about the first axis 44, and which is in turn supported by a second support frame 50 rotatably mounted for rotation about the second axis 46. Each of the first and second support frames 48, 50 are driven by a respective electric motor (with gear box) 52 via a chain and sprocket transmission 54. The motor and transmission for driving the first support frame 48 are mounted on the second support frame 50, whereas the motor and transmission for driving the second support frame 50 are mounted on a structural frame 56 of the APM 10. Electric motor 52 for driving the second support frame 50 is provided with a variable speed drive (VSD) unit preset to ramp the speed of the motor up and down at a predetermined rate whenever the motor 52 is switched ON or OFF respectively.

A first rotary joint 58 is adapted to allow the air stream carrying the plastics material powder to pass from one side of the joint on the outside of support frame 50, which remains stationary relative to the rotating mould 40, to the other side of the joint which rotates with the first support frame 48 about the first axis 48. A second rotary joint 60 is mounted on a structural frame 56 and is connected to the first rotary joint 58 via a transfer line extension 62. The first rotary joint 58 orbits about the second axis 46. The second rotary joint 60 is adapted to allow the air stream from line extension 62 to pass from one side of the joint 60 on the outside of structural frame 56, which remains stationary relative to the rotating mould 40, to the inside of the second support frame 50 which rotates with the mould 40 about the second axis 46. The first and second rotary joints 58, 60 operate to allow the plastics material powder carried in the air stream via transfer line 38 to be delivered to the mould 40 while it is biaxially rotating about the first and second perpendicular axes 44, 46.

The specific construction and operation of the rotary joints 58, 60 is described in detail in the specification which accompanied commonly owned Australian Patent Application No. AU 42099/96 filed on 19 Jan. 1995, and will not be described in detail again here.

As can be seen most clearly in FIG. 5, each rotatable mould assembly 42 of the APM 10 incorporates a pair of pallet moulds 40 comprising first and second components 64 and 66 forming the lid and base respectively of the respective moulds. In FIG. 5 the top mould 40 is shown in an opened position, whereas the bottom mould 40 is shown in a closed position. The lid 64 and base 66 of each pallet mould are shaped to produce the desired configuration of the finished rotamoulded pallet, and include a series of nine depressions 68 in the base 66 of the mould to form the feet of the finished pallet. In this embodiment, the lid 64 of the pallet mould is moveable relative to the base 66 between a first position in which the mould is closed and ready to receive a shot of plastics material powder and a second position in which the mould is opened and the finished rotamoulded pallet can be removed. Each mould 40 is also provided with actuating means in the form of a pair of pneumatic rams 70 for moving the lid 66 of the mould between the opened and closed positions.

An important feature of the present invention is that each rotatable mould 40 is provided with heating means in connection therewith for heating the mould directly during rotation. In this embodiment, the heating means comprises a plurality of electric heating elements 74 mounted in close proximity to predetermined areas of the first and second components 64, 66 of the moulds 40. The arrangement of the heating elements 74 can be seen most clearly in FIG. 4. The heating elements 74 are mounted in thermal contact with the respective external surfaces of the first and second components 64, 66 and are covered by an insulating jacket 76 designed to ensure that most of the heat generated by the heating elements 74 is reflected and/or conducted into the moulds 40. The first and second components 64, 66 of the moulds 40 are typically manufactured from a material having a high thermal conductivity, such as cast aluminium, and the insulating jacket 76 comprises a glass fibre insulating mat with a reflective aluminium vacuum-formed skin and housed within a steel casing 78. The electric heating elements 74 are capable of heating the moulds 40 to temperatures exceeding 200° C., however even at maximum heating temperatures, the external surface of the steel cladding 78 only remains warm to the touch.

Electrical power for the heating elements 74 is transmitted to the rotating moulds 40 via first and second electrical rotary contacts 80, 82 provided on the first and second axes of rotation 44, 46, in a similar manner to that of the first and second rotary joints 58, 60. In this embodiment, the heating elements 74 are arranged on the first and second components 64, 66 of the mould in such a way as to provide substantially uniform heating over the entire internal surface area of the mould. However, clearly the heating elements 74 could be arranged in connection with the mould so as to provide any desired thermal profile over the inner surface of the mould. Furthermore, each of the heating elements can be operated independently so as to increase or decrease the heat applied to selected areas of the mould. This may be advantageous, for example, where additional thickness is required in the wall of the rotamoulded product in selected areas. Additional heat could be applied in the selected areas so as to accelerate the deposit of melted plastics material powder in those areas relative to the remainder of the inner surface of the mould.

Each rotatable mould 40 is also provided with sensing means in connection therewith for sensing the temperature of the mould and generating a temperature signal which is transmitted to the electrical control means via the electrical rotary contacts 80, 82. The sensing means typically comprise a plurality of temperature sensing devices, such as, for example, K-type thermocouples 84, embedded at predetermined locations in at least one of the first and second components 64, 66 of the mould. Typically, both the lid 64 and base 66 of the mould are provided with two thermocouples 84, at least one of which is arranged to sense the temperature at the inner surface of the mould. The other thermocouple 84 may be arranged to sense the temperature at the external surface of the first and second components 64, 66 respectively of the mould. The two halves of a mould may have different temperature profiles depending on the thickness of the melted plastics material.

The rotatable mould assembly 42 also incorporates means for injecting the plastics material powder into the mould 40. Typically, the means for injecting the powder comprises an injector 90, (see FIG. 5) having an inlet 92 and an outlet 94 adapted to extend into the mould 40 for introducing the plastics material powder into the mould. The air stream carrying the fluidised plastics material powder is delivered to the injector 90 via a second transfer line extension 98 from the first rotary joint 58. A pneumatic ram 99 is provided for moving the injector 90 between a first position in which the first outlet 94 extends into the mould (as illustrated in FIG. 5), to allow the plastics material powder to pass into the mould, and a second position in which the first outlet 94 is withdrawn to prevent any further plastics material powder from passing into the mould. Only one of the moulds 40 illustrated in FIG. 5 is shown fitted with an injector 90, however both moulds 40 are typically provided with an injector for delivering powder to the mould during rotation. The structure and operation of injector 90 are described in detail in the specification which accompanied Australian Patent Application No. AU 42099/96 and will not be described again here.

The first and second components 64, 66 of the pallet mould have cooling means provided in connection therewith to enable forced cooling of the mould 40 to accelerate solidifying of the rotamoulded product at the end of the heating cycle. The cooling means in this embodiment comprises a passage, (not visible in the drawings) extending through the casing 78 adjacent to the outer surfaces of the lid 64 and base 66 respectively of the moulds 40. Air movers 101 are connected to inlets 100 to the air passages for pumping cooling air through the passages and out through the cooling air exits 102. The cooling air exits 102 are arranged remote from, and with their axes substantially perpendicular to, the air inlets 100 so that the cooling air is forced to circulate within the casings 78. A proportion of the air pumped through the air passage may be refrigerated air in order to enhance the cooling effect.

Figure 9A:
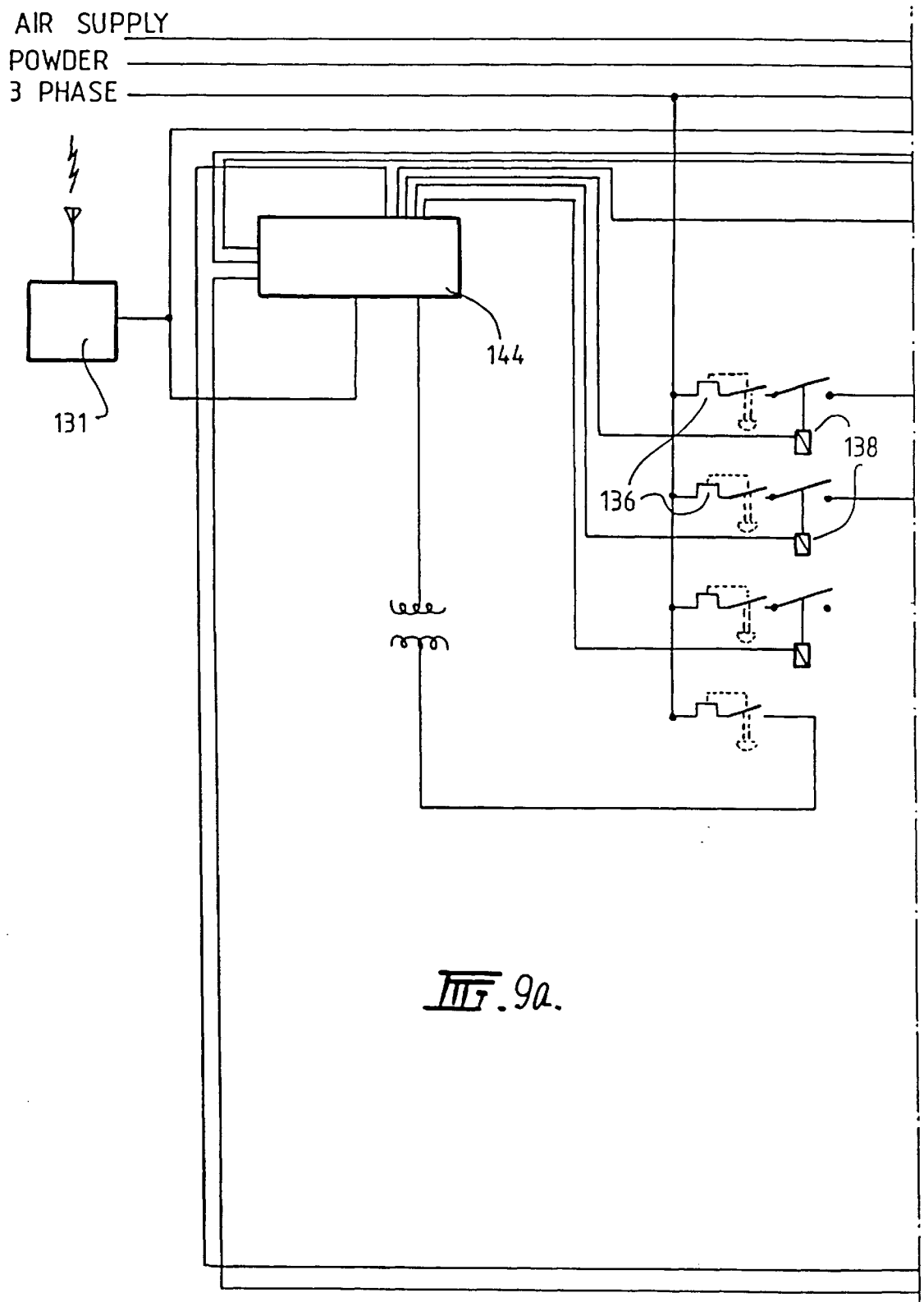

FIG. 9(a) illustrates schematically part of the pneumatic circuit, flow path of powder and the electric power and control circuit external to the rotatable mould assembly 42 of a production module 14. An RTU 144 performs similar functions to the RTU 130 in the control module 12. A pair of overload circuit breakers 136 and relays 138 provide three-phase power to the electric motors 52 on the rotatable mould assembly 42. Electrical power is supplied directly to the motor 52 mounted on the stationary structural frame 56, and is supplied via the rotary contact 82 to the motor mounted on the second rotatable support frame 50. Three-phase power is also supplied to the electrical heaters on the moulds 40 via rotary contact 80. RTU 144 also controls a pneumatic cylinder 148 via pneumatic valve 150, for controlling the supply of fluidised plastics material powder to the rotatable mould assembly 42 via diverter valve 152. The powder is delivered to the rotating mould via rotary contacts 60 and 58 as previously described. The pneumatic cylinder 112 used for actuating the lifting arm 110 of the pallet stacker is also controlled by RTU 144 via pneumatic valve 154. Each production module 14 is provided with two RTUs, the first RTU 144 being located external to the rotatable mould assembly 42, and a second RTU 160 (see FIG. 9(b)) being provided internal to the rotatable mould assembly 42.

Figure 9B:
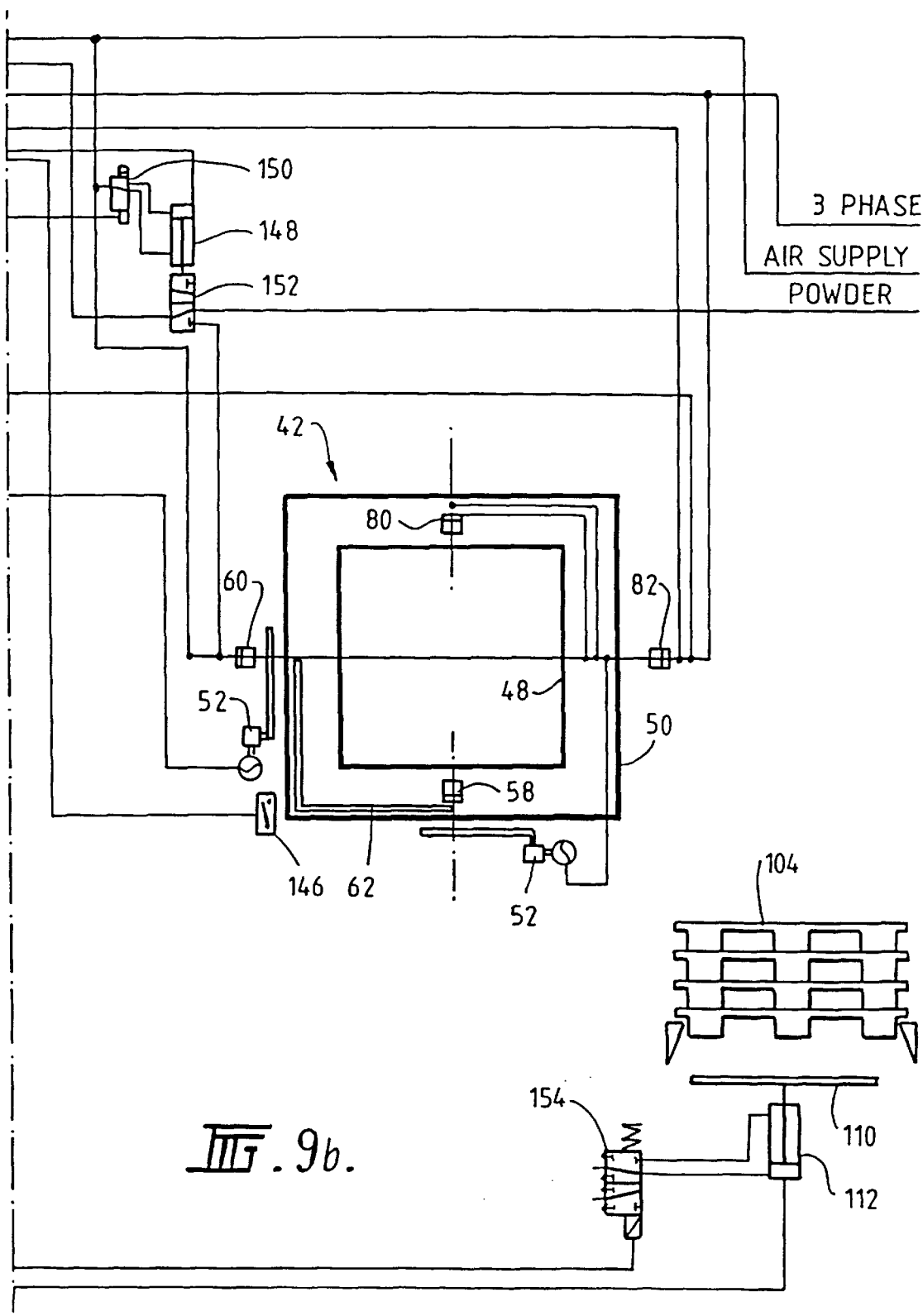
Figure 9C:
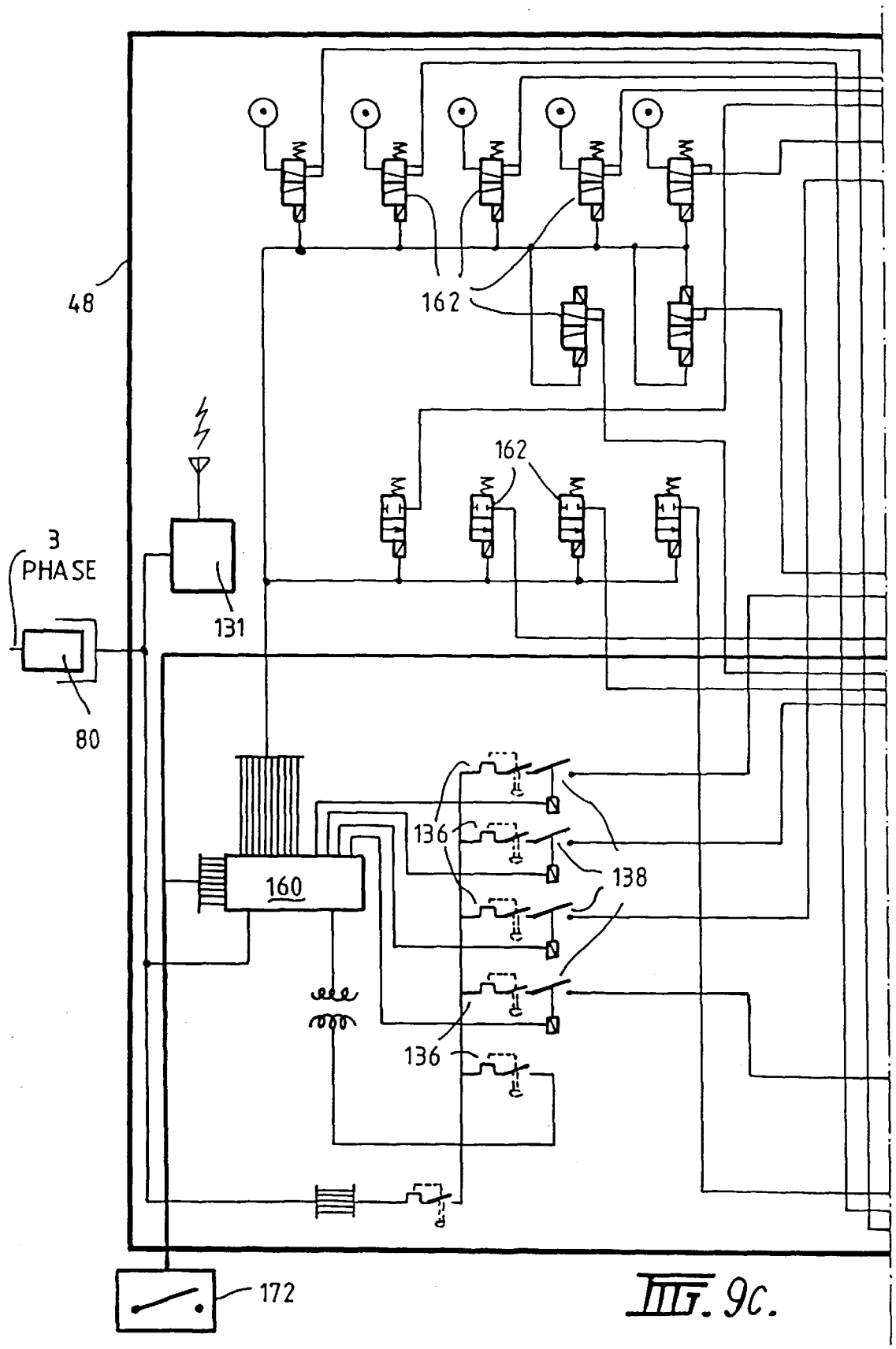
Figure 9D:
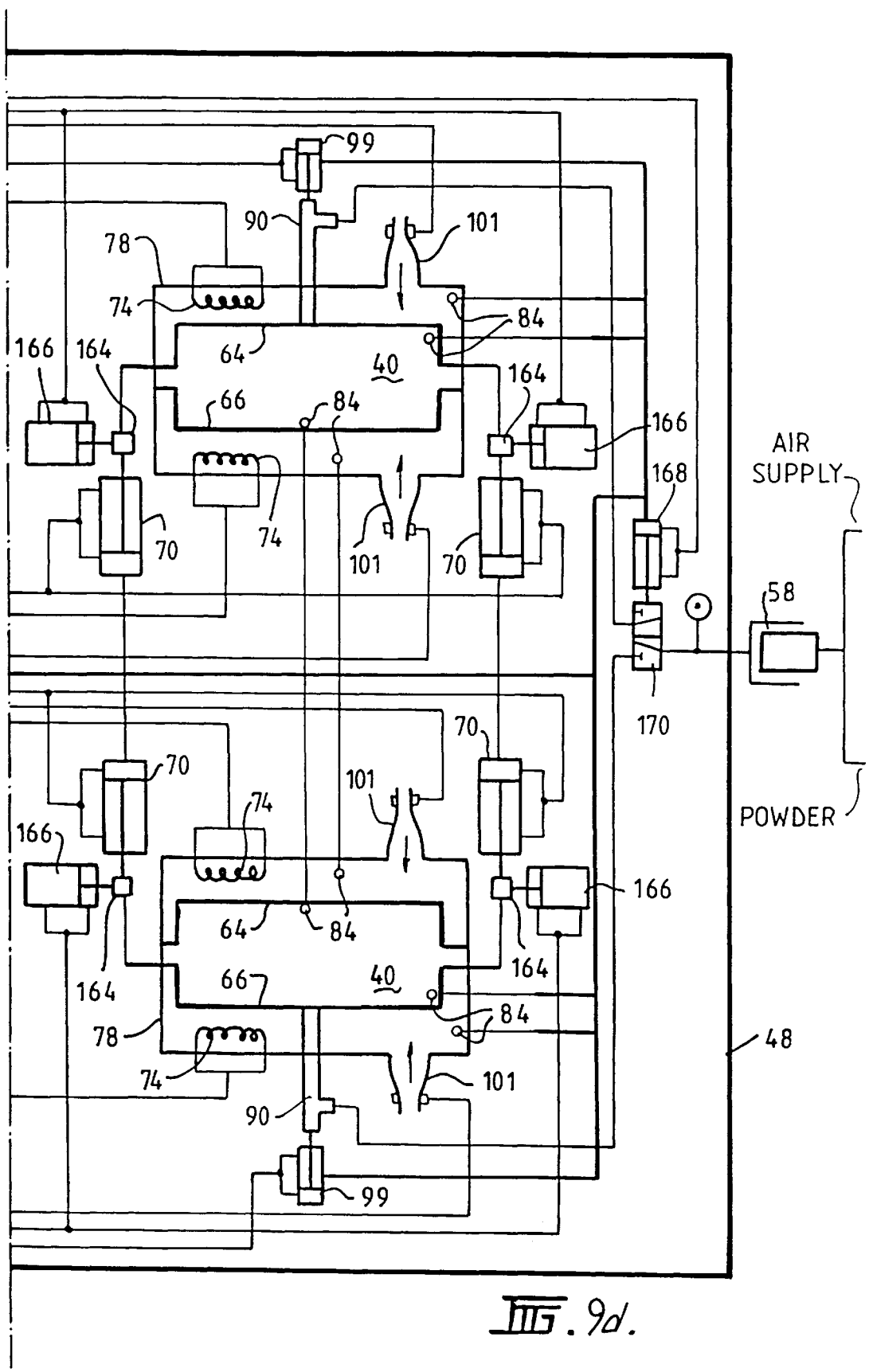

FIG. 9(b) is a schematic illustration of the pneumatic circuit, the flow path of powder, and the electric power and control circuits located within the first support frame 48 of the rotatable mould assembly 42 in one of the production modules. Both the pneumatic and electric circuits are under the control of RTU 160 which perform similar functions to the RTU 130 in the control module 12. The supply of three-phase electrical power to each of the heating elements 74 provided in connection with the first and second components 64, 66 of the moulds 40, is controlled by RTU 160 via circuit breakers 136 and relays 138. RTU 160 also controls the operation of each of eleven pneumatic cylinders via pneumatic valves 162. Two of the valves 162 control the respective pairs of pneumatic cylinders 70 for moving the lids 64 of the pallet moulds between the opened and closed positions. Each of the pneumatic rams 70 are locked in the opened or closed position by a lock mechanism 164 which is released by a pneumatic cylinder 166. Hence, should the supply of compressed air fail for any reason, the moulds 40 will remain locked in their opened or closed position. Two of the pneumatic valves 162 control each pair of lock pneumatic cylinders 166. Two more pneumatic valves 162 control the supply of compressed air to the cylinders 99 for moving the cyclones 90 into and out of the moulds 40. Another one of the pneumatic valves 162 controls the supply of compressed air to a pneumatic cylinder 168 which controls a diverter valve 170 that controls the supply of fluidised plastics material powder to the respective moulds 40 via cyclones 90. At any one time, fluidised powder is supplied to only one of the moulds 40. Finally, each of the air movers 101 supplying cooling air to the casing 78 for each mould is controlled by a separate pneumatic valve 162.

RTU 160 also receives numerous inputs from various sensing devices. Each of the pneumatic rams 70, 99 and 168 are fitted with proximity sensors so that the computer terminal 24 can detect the position of the first and second components 64, 66 of each mould, the position of the cyclones 90 and the position of the diverter valve 170 at any time, by polling RTU 160. RTU 160 also receives inputs from each of the thermocouples 84 so that the computer terminal 24 can monitor temperature variations both at the inner surfaces of the lid 64 and base 66 of each mould as well as within the casing 78. The number of inputs and outputs to the RTU 160 may be increased to accommodate additional sensing devices and control functions if required.

FIGS. 6 and 7 illustrate a preferred form of pallet stacker 22 for stacking the pallets 104 as they exit from the APM 10. As shown in FIG. 6, when a pallet 104 is ejected from the rotatable mould assembly 42 it is carried by the conveyor 20 to the pallet stacker 22. The pallet stacker 22 operates by stacking the pallets from the bottom up. As the conveyor 20 conveys a pallet into the bottom of the stacker the pallet 104 eventually strikes a stop at an end wall 106 of the stacker. This automatically triggers a lifting mechanism within the stacker which operates to lift the pallet 104 a prescribed height where it is held by a plurality of toggle latches 108 to make room for the next pallet underneath. The lifting mechanism comprises a pair of lifting arms 110 actuated by a respective pneumatic ram 112 which is speed-adjustable and self-returning. When the pneumatic rams 112 are activated the lifting arms 110 lift the latest pallet 104, (together with any earlier pallets already in the stacker) to a height just above the toggle latches 108. Toggles latches 108 pivot inwards to allow the latest pallet 104 to move upwards, and then pivot outwards again to support the pallets in a stacked position when the lifting arms 110 return to their lowered position. The stacker 22 is then ready to receive the next pallet 104.

If desired, means for marking each of the finished pallets may be provided adjacent to or in connection with the pallet stacker 22. Such marking means may comprise, for example, an ink jet printer for printing the manufacturer's product name, trade mark and/or serial number on each pallet.

The control sequence for the APM 10, as effected by a process control program provided in one of the computer terminals 24, will now be described in detail. Referring to FIG. 11, the first step 200 after the power is switched ON requires the machine operator to log on to the terminals 24. Then at step 202 the desired recipe for the rotamoulded product is loaded into the computer terminal, for example, from a floppy disc. A typical process control recipe for a rotamoulded product may specify the following control parameters:

(i) The "cooking" temperature-time characteristic
(ii) The quantity (weight) of powder in each shot
(iii) The number of dumps (shots) of powder
(iv) The sequence and timing of dumps relative to the temperature-time characteristic
(v) The start and stop positions of the rotatable mould assembly
(vi) The ratio of rotation
(vii) The mould finish temperature The ratio of rotation $R_{rot}$ may be calculated as follows:

$$R_{rot} = \frac{V_{min}}{V_{min} - V_{maj}}$$

Where $V_{min}$=the speed of rotation of the mould about the minor axis of rotation (in RPM).

$V_{maj}$=speed of rotation of the mould about the major axis of rotation (in RPM).

The ratio of rotation $R_{rot}$ may vary depending on the shape of the product, in order to achieve the desired distribution of plastics material powder over the inner surface of the mould.

FIG. 11 illustrates a typical temperature-time characteristic employed in the manufacture of a rotamoulded plastic pallet having a high density polyethylene (HDPE) skin filled with foamed polyethylene. The powder used to form the HDPE skin is the first shot or dump in the rotamoulding process, and the foamed polyethylene interior is the second shot or dump in the process.

The vertical axis in the graph of FIG. 11 illustrates the temperature at the inner surface of the mould where the powder first starts to melt. The initial temperature of the mould at time $T_0$ is above ambient and is the temperature to which the mould is cooled (in a previous cycle) to allow the pallet to solidify sufficiently to be ejected from the mould.

Once the recipe has been loaded at step 202 in FIG. 10 the process control program in computer terminal 24 sets and confirms all variables provided from the recipe at step 204. At step 206 the program checks the powder, air and power circuits in the APM and continues to monitor all overload and alarm states. The APM is now ready to commence automatic mass production of plastic pallets. At step 208 the rotamoulding process commences in accordance with the recipe when instructed to start by the machine operator. This is represented as time $T_0$ in FIG. 11. At time $T_0$ the process control program switches ON the electrical heating elements on the two moulds in one of the rotatable mould assemblies 42 at step 210, and simultaneously meters the prescribed quantity of plastics material powder for the first shot at step 212 according to the recipe. At step 214, when the moulds reach a prescribed temperature set by the recipe and sensed by the thermocouples 84, the first shot of powder is dumped to the mould at step 216. Although not indicated in FIG. 10, rotation of the rotatable mould assembly 42 also commences at step 210 when heating of the moulds commences, or sometime thereafter but prior to step 216 when the first shot of powder is dumped to the moulds.

At step 218 the control program commences the "cooking" cycle in accordance with the temperature-time characteristic provided in the recipe. The temperature of the moulds and the melt is continually monitored and electrical power to the heating elements 74 is modulated in order to track the prescribed temperature-time characteristic as closely as possible. At time $T_1$ the dump starts to melt and there is a noticeable change in the temperature characteristic due to the endothermic reaction.

Meanwhile, the control program meters a second shot of plastics material powder at step 212 into one of the primary hoppers 26. The second shot will form the foamed plastic inner matrix of the plastic pallets. When the first dump is cooked at step 220 the second shot of powder is dumped at time $T_2$ represented by step 222 in FIG. 10. Meanwhile, the control program proceeds to meter another shot of powder at step 212, which will be the first shot for the next pallet. At time $T_3$ the second dump of powder starts to melt and the temperature of the moulds is maintained in accordance with the recipe as represented at step 224 in FIG. 10. At time $T_4$ the electrical heating elements are switched OFF and the cooling cycle commences at step 226. The moulds are allowed to cool naturally for a prescribed time in order to allow crystallisation and/or solidification of the melt to occur. At time $T_5$ forced cooling of the moulds is commenced by turning on the air movers 101. At time $T_6$ the cooling cycle is completed and at step 228 the mould is set for opening and ejection of the pallet. During the period between times $T_6$ and $T_7$ the rotatable mould assembly 42 is rotated to a first position in which the respective moulds are opened and further cooling of the pallet occurs, and then it is rotated to a second position in which the pallet can fall out of the mould under its own weight onto the conveyor 20 as illustrated in FIG. 6. In order to enable the control program to correctly position the mould assembly, a proximity switch on the outer support frame 50 is activated when the VSD unit on motor 52 is actuated during deceleration. An optical sensor on the inner frame 48 enables the APM to stop the inner frame in the desired position. The control program is to some extent self-correcting so that if, for example, a pallet does not drop out under its own weight the rotatable mould assembly 42 is rotated through a predefined sequence before trying again. Ejection of the pallet is indicated at step 230 in FIG. 10. When both pallets have been ejected from the rotatable mould assembly 42 the mould is closed at step 232. The control program returns to the beginning of the heating cycle at step 210, and the heating cycle recommences at time $T_8$ if another pair of pallets is to be produced.

The heating cycle for each of the production modules 14 of the APM 10 are operated sequentially so that at any one time three-phase electrical power is being supplied to the electrical heating elements of only one rotatable mould assembly 42 in order to minimise power consumption. Obviously, if overload of the power supply is not an issue some overlap in the heating cycles can be tolerated. Also, although in FIG. 10 there is reference to only one mould, both moulds in each production module operate substantially simultaneously. The only exceptions are during the delivery of powder to the respective moulds at step 216, which is performed sequentially by operating diverter valve 170 (see FIG. 9(*b*)), and at step 230 when the pallet is ejected from one mould and then the other. With the sequential operation of the production modules described above, the APM 10 produces a new pair of plastic pallets approximately every ten minutes.

The APM 10 has a number of significant advantages over conventional methods of producing plastic pallets, not least of which is the substantial reduction in the cost of producing the pallets. Advantages of the APM include, but are not limited to:

(a) Labour content in production is all but eliminated (b) Decreased production cycle time due to direct heating of the moulds (c) Automation of the double dump procedure made possible by powder delivery means (d) Automatic ejection, conveying and stacking of the finished pallets (e) Improved quality control.

Now that a preferred embodiment of the automatic rotamoulding process and method of control have been described in detail, it will be apparent to persons skilled in the relevant mechanical, electrical and rotamoulding arts that numerous variations and modifications may be made, in addition to those already described, without departing from the basic inventive concepts. For example, the rotatable mould may have more that two components if more complex shapes are involved. Furthermore, the number of modules and their arrangement can be varied, and each production module may be set up to produce different products. In the APM three production modules were selected due to the typical production cycle time for the rotamoulded pallets. Furthermore, each production module 14 can operate independently of the other modules under the control of a remote computer if desired. In addition, any suitable delivery means for delivering plastics material powder to the moulds during rotation can be employed, although the delivery means described in Australian Patent Application No. PN0666 is preferred. Other forms of heating means for directly heating the moulds can also be employed, for example, a fan forced gas fired heat exchanger. Hot air is pumped through passages provided in or immediately adjacent to the moulds to heat them to the desired temperature. This arrangement has the advantage that the same passages can also be used to pump a coolant through to cool the moulds. The thermal profile over the inner surface of the moulds can be designed by careful selection of the configuration of the passages. The coolant may include water or water vapour, and may also be designed to induce an evaporative cooling effect. All such variations and modifications are to be considered within the scope of the present invention, the nature of which is to be determined from the foregoing description and the appended claims.

The claims defining the invention are as follows:

1. An automatic rotamoulding apparatus comprising:

a rotatable mould mounted for rotation, having heating means provided in connection therewith for heating the mould directly during rotation and sensing means provided in connection therewith for sensing the temperature of the mould;

delivery means for automatically delivering a plastics material powder to the mould during rotation; and, electronic control means operatively connected to said delivery means, said heating means and said sensing means, for controlling the delivery of plastics material to the mould and for controlling the temperature of the mould throughout the rotamoulding process responsive to said sensing means whereby, in use, a rotamoulded product can be produced in the mould without manual intervention.

2. An automatic rotamoulding apparatus as defined in claim 1, wherein said rotatable mould is one of a plurality of rotatable moulds mounted in a plurality of modules, each module being independently operable under the control of said electronic control means.

3. An automatic rotamoulding apparatus as defined in claim 2, wherein each mould comprises first and second components movably mounted within a first support frame adapted for rotation about a first axis, actuating means being provided for automatically moving said first component of the mould relative to the second component between a first position in which the mould is closed and ready to receive a shot of plastics material powder, and a second position in which the mould is opened and the finished rotamoulded product can be removed.

4. An automatic rotamoulding apparatus as defined in claim 3, wherein said actuating means comprises a pneumatic ram operatively connected to said electronic control means for moving the first and second components between said first and second positions.

5. An automatic rotamoulding apparatus as defined in claim 4, wherein said heating means comprises a plurality of electric heating elements provided in thermal contact with the first and second components of the mould and said sensing means comprises a plurality of temperature sensing devices provided in connection with the first and second halves of the mould in predetermined locations.

6. An automatic rotamoulding apparatus as defined in claim 2, wherein each rotatable mould further comprises cooling means to facilitate forced cooling of the mould following heating.

7. An automatic rotamoulding apparatus as defined in claim 6, wherein said cooling means comprises a passage extending proximate to said first and second components of the mould and pumping means operatively connected to said electronic control means for pumping cooling medium through said passages.

8. An automatic rotamoulding apparatus as defined in claim 1, further comprising conveyor means for conveying a finished rotamoulded product from the mould to a location remote from the mould.

9. An automatic rotamoulding apparatus as defined in claim 8, wherein the apparatus is also provided with stacking means for stacking the finished rotamoulded products as they arrive at said remote location.

10. A method for controlling an automatic rotamoulding process using an electronic control means operatively connected to a delivery means, a heating means and a sensing means, the method comprising the steps of:

metering a first prescribed quantity of plastics material powder into a hopper to be delivered to a rotatable mould as a first shot;

operating said heating means provided in connection with the mould to heat the mould;

actuating said delivering means, in response to said sensing means sensing a prescribed temperature of the mould, to deliver the first shot of powder from said hopper to the mould and simultaneously rotating the mould so as to distribute the powder over an interior surface of the mould;

monitoring said sensing means provided in connection with the mould to sense the temperature of the mould during rotation;

controlling the operation of said heating means in accordance with a predetermined temperature-time characteristic and responsive to said monitoring of the sensing means;

cooling the mould; and, ejecting the finished rotamoulded product from the mould.

11. A method for controlling an automatic rotamoulding process as defined in claim 10, further comprising the steps of:

metering a second prescribed quantity of plastics material powder into a hopper, to be delivered to the rotatable mould as a second shot; and, actuating the delivery means to deliver the second shot of powder from the hopper to the rotating mould.

12. A method for controlling an automatic rotamoulding process as defined in claim 10, further comprising the steps of:

conveying the finished rotamoulded product on a conveyor to a stacking apparatus; and, stacking the finished rotamoulded product to form a stack of such finished rotamoulded products.

* * * * *